J. Embree,
Gage Lathe.

N° 3,695.   Patented Aug. 7, 1844.

UNITED STATES PATENT OFFICE.

JAMES EMBREE, OF MARSHALTON, PENNSYLVANIA.

MACHINE FOR MAKING SCYTHE-HANDLES AND OTHER CURVED ARTICLES OF LIKE CHARACTER.

Specification of Letters Patent No. 3,695, dated August 7, 1844.

*To all whom it may concern:*

Be it known that I, JAMES EMBREE, of Marshalton, in the county of Chester and State of Pennsylvania, have invented a new and useful Manner of Constructing Machines for Sawing and Turning Scythe-Handles and other Articles of a Like Character; and I do hereby declare that the following is a full and exact description thereof.

In the accompanying drawing Figure 1, is a perspective view of my machine, on the side which contains the sawing apparatus.

A, is a carriage, that may be made to advance in the usual manner.

B, is a narrow saw, (shown in dotted lines) which is to be hung in a gate, and operated like other mill-saws.

C, Fig. 2, is a second carriage which rests upon the carriage A, and has friction wheels, $a, a$, at its ends, which wheels operate against the cross timbers, $b, b$, on the carriage, A, and check the carriage, C, endwise. The stuff to be sawed is to be placed on the carriage, C, and confined there by suitable blocks and dogs. The carriage C, has guide clips on its lower side, at each end, which embrace guide strips, of the proper curvature, placed upon the floor of the mill.

A′ Fig. 1, shows the floor with the curved guide strips, $c, c$, made fast upon it.

$d, d$, are the guide clips, the upper ends of which $d'$, are cylindrical, and enter holes in the ends of the carriage, C.

It will be manifest that any necessary curvature may be given to the stuff by means of the strips, $c, c$, and that by turning the log, the stuff may be sawed to the desired curvature in both directions.

This constitutes the first part of my improvement, which consists in preparing the stuff for the turning, or rounding, apparatus, which I will now proceed to describe.

D, is a wheel which carries the cutter by which the handles, or other articles, are to be rounded, and carrying, also, other apparatus necessary in the operation. This wheel is driven by a band, $a', a'$, which embraces its periphery, and is carried by a pulley on the shaft to which the power is applied.

Fig. 3, is an elevation of that side of the machine which is opposite to that shown in Fig. 1.

E, is the main shaft which may be driven by any adequate power, and F, a band wheel, or whirl, on said shaft, carrying the band $a', a'$, which passes around the wheel D.

The pieces to be turned, or rounded, are to be passed through an opening in the center of the wheel, D; the face of this wheel having attached to it a sliding cutter, and guides, shown distinctly in Fig. 4.

G, G, Fig. 3, are two vertical guide pieces, which work on joints at $e, e$, by which they are connected to the two end pieces, $g, g$, and these end pieces work on centers at $h, h$. The pieces, G, G, and $g, g$, thus constitute a parallelogram which may be opened, or closed, by the lever $g'$, and a weight, H, attached to $g'$, will draw the pieces G, G, together.

I, I, are two toothed feeding rollers which are made to revolve by pulleys $i, i$, on their shafts, $j, j$. These rollers are made to form a part of a jointed parallelogram by means of the end connecting pieces, $k, k$, having joints at $f, f$, and working on joint pins, $l, l$, at their centers. The feeding rollers, I, I, are drawn together by means of the weight, K.

In Fig. 1, $m, m$, are pulleys which carry the bands that extend around the pulleys, $i, i$, on the shafts $j, j$, of the feeding rollers, Fig. 3, one of which bands must be crossed, as at $m'$. The joint pins at $f, f$, are attached to pieces of metal which form collars in which the shafts $j, j$, revolve. On the collar L, which surrounds the opening in the wheel, D, seen in Fig. 1, there is an endless screw cut at $n$, which, by means of the toothed wheel M, gives motion to the pulley, $o$, and this to the large pulley N, on the shaft of the pulleys, $m, m$, from which the bands extend to the pulleys, $i, i$.

Fig. 5, is a vertical section through the axis of the wheel, D, intended to represent the manner in which it is sustained by, and revolves on, a stationary collar, and also the manner of its action in regulating the sliding of the guide pieces, and cutter.

The outer portion, or rim, of the wheel, D. D, Fig. 4, and its inner portion, D′, D′, are not in one piece, the latter consisting of a circular plate, or disk, movable in the rim, D, D, and having on its the projecting fillets, O, O, which serve to sustain the cutter, P, and the guides, Q, Q, that slide in them.

When the handles, or other articles to be turned, are to be of the same size from end to end, the cutter and guides may be firmly fixed in place; but scythe handles, and others which require to be tapered, render it necessary that the cutter and guides should regularly approach toward, or recede from, the center as the operation goes on. The guides, Q, Q, and the cutter P, have pins on their under sides, at their outer ends, which pass into the eccentric slots, p, p; and if the part D', D', of the wheel be made to revolve to a short distance within the part D, D, the cutter and guides will be moved in, or out; this motion need not, in a large machine, exceed half an inch.

R, is a curved ratchet attached to the part D, D, of the wheel which may be moved in, or out, of gear with a pinion q, which is attached to the part D', D'; the pinion q, is made to revolve by means of the wheel r, taking into an endless screw on the back side of the disk, D', as hereinafter explained.

Fig. 5, is, as above named, a section through the axis of the wheel D, and the collar in which it is supported.

Figure 1:
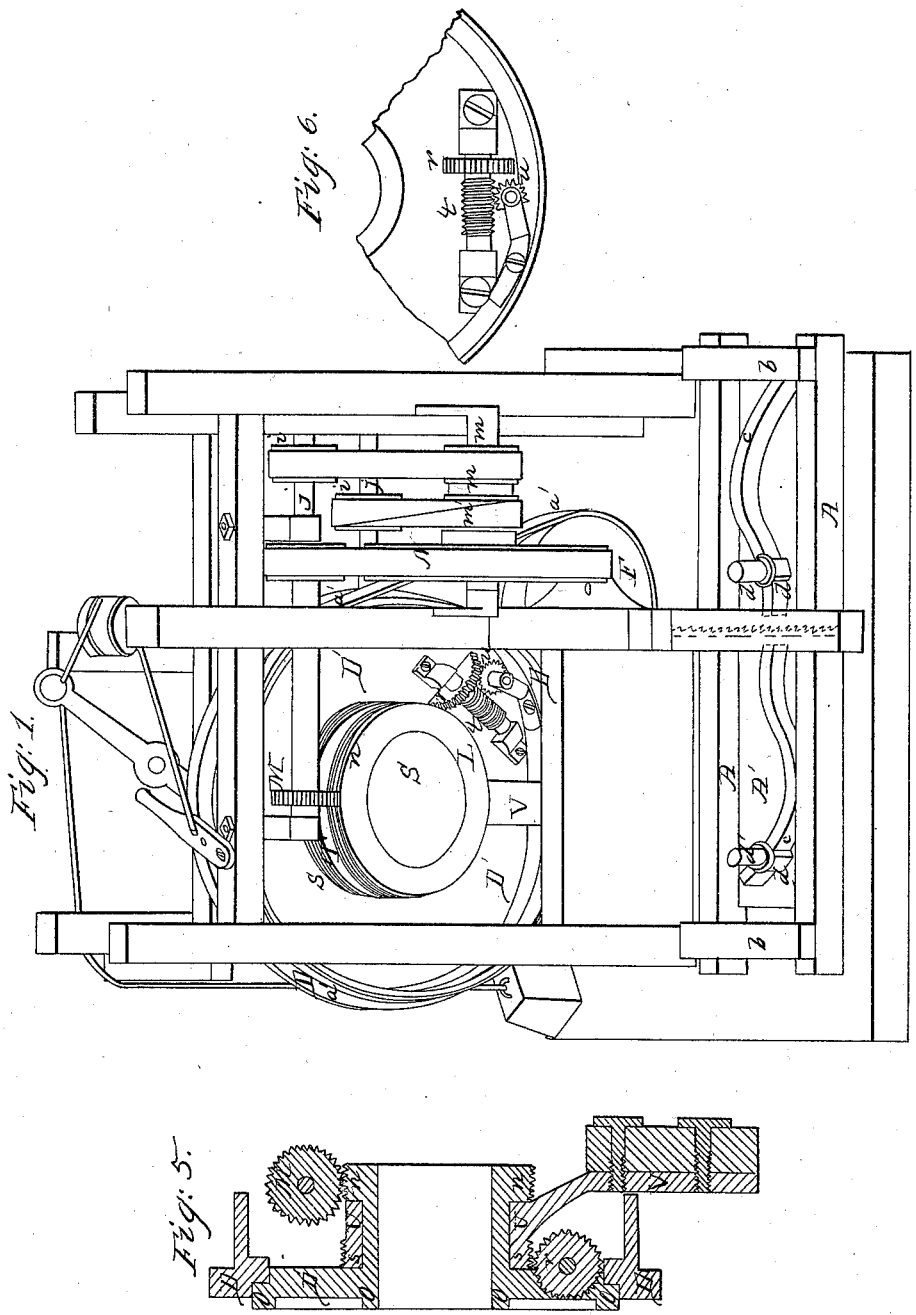
Figure 2:
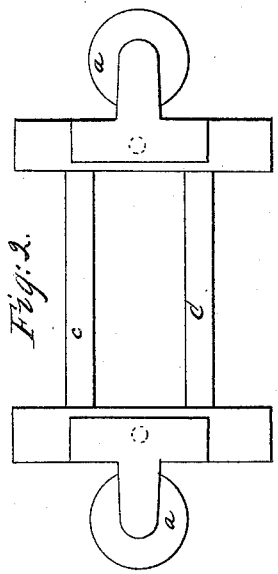

S, is the opening through the wheel, D, and T, T, a ferrule, or rim, attached to D', D'; this rim has an endless screw, n, n, on it, which gives motion to the wheel M, and the whirls, or pulleys, O, N, and m, m, as seen in Fig. 1, and above described.

U, U, is a stationary collar, supported by the bracket V, which is made fast to the frame work of the machine; the collar, U, surrounds the ferrule, or rim, T, T, and sustains the wheel D, as it revolves.

s, s, is an endless screw, cut upon the collar, U, which remains stationary, and has the toothed wheel, r, geared into it; and as this wheel has its bearings on D', D', the revolution of the wheel D, D, will cause that marked r, to revolve.

Figure 4:
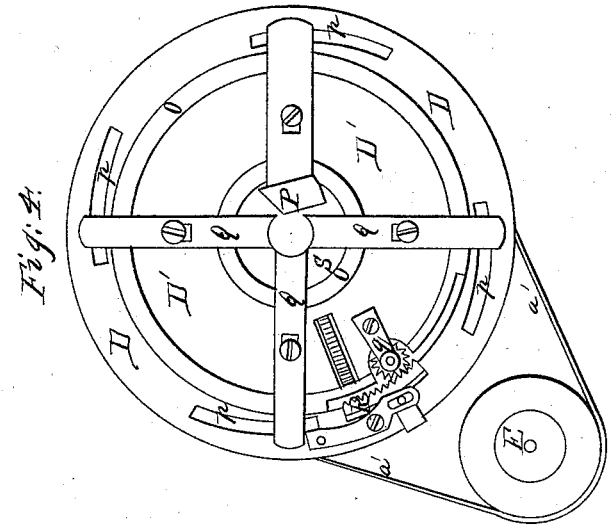
Fig. 4, shows the face of the wheel D, with its sliding cutter, and guides, and other appendages, the front of the frame of the machine, and the parallelograms seen in Fig. 3, being removed for the purpose of exhibiting said wheel.
Figure 3:
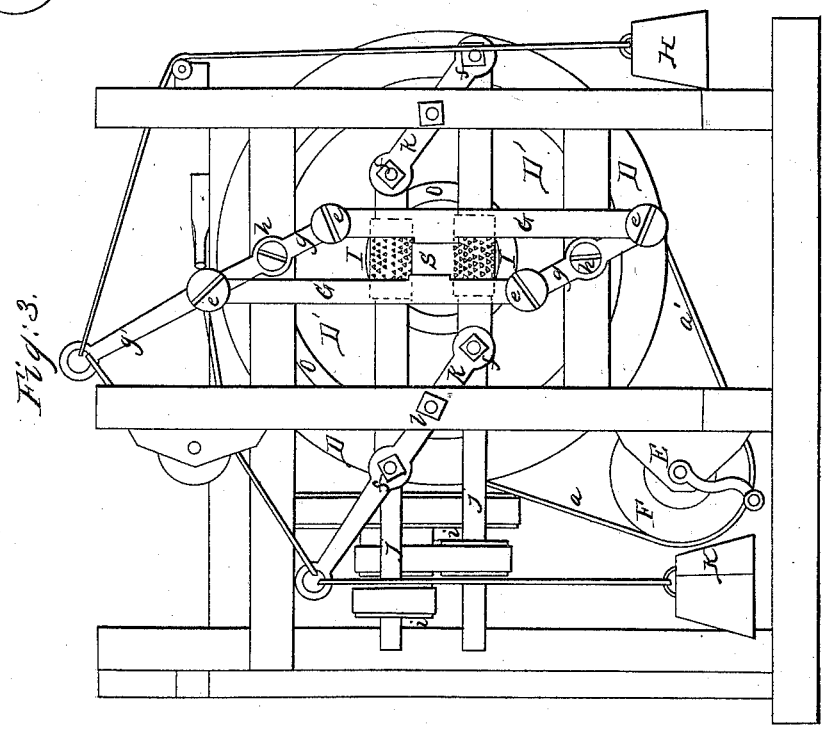

Fig. 6, shows that part of the inside of the wheel, D, D, D', D', to which the wheel r, and its appendages are attached.

t, is an endless screw on the shaft of the wheel r, gearing into the pinion u, which is on the same shaft with the pinion, q, Fig. 4.

From the manner in which the part just described is constructed, it will be seen that the motion necessary for the regulating of the cutter, P, and the guides Q, Q, will be obtained.

In using this machine, it is not necessary to remove the angles from the stuff to be turned, excepting at the entering point; to do so would interfere with the action of the feeding apparatus.

Having thus fully described the nature of my machine for manufacturing scythe handles, and other articles, and shown the operation of the respective parts thereof, what I claim therein as new, and desire to secure by Letters Patent, is,

1. The manner in which I have arranged and combined the apparatus for sawing the stuff to the proper curvature, said combined apparatus consisting of the carriage A, the second carriage C, with its friction wheels, a, a, the curved guide strips, c, c, and the clips d, d, with their cylindrical stems received within holes in the ends of the second carriage C, substantially as set forth.

2. I also claim the manner of arranging and combining the two parallelograms in which the vertical guide pieces, G, G, and the toothed feeding rollers, I, I, are made to embrace, conduct, and direct, the handle to be turned, through the opening in the wheel, D, D; the feeding rollers being made to revolve, and the other parts of the parallelograms, being acted upon and governed, as described.

3. I claim the combination and arrangement of the parts employed in causing the cutter, P, and the guides, Q, Q, to approach, and recede from, the center of the wheel D, during its rotation as set forth.

JAMES EMBREE.

Witnesses:
   THOS. P. JONES,
   EDWIN L. BRUNDAGE.